_United States Patent_ [19]

Johansson

[11] 4,209,546

[45] Jun. 24, 1980

[54] PROCESS FOR THE CONTINUOUS PRODUCTION OF A BUTTER-LIKE EDIBLE FAT PRODUCT

[75] Inventor: Mats S. J. Johansson, Malmö, Sweden

[73] Assignee: Svenska Mejerierhas Riksforening U P A, Stockholm, Sweden

[21] Appl. No.: 967,667

[22] Filed: Dec. 8, 1978

[30] Foreign Application Priority Data

Jan. 25, 1978 [SE] Sweden ................ 7800900

[51] Int. Cl.² ............................................ A23D 3/02
[52] U.S. Cl. .................................. 426/603; 426/585; 426/586
[58] Field of Search ............... 426/581, 585, 586, 603, 426/663, 664, 613

[56] References Cited

U.S. PATENT DOCUMENTS

| | | | |
|---|---|---|---|
| 1,028,804 | 6/1912 | Winship et al. | 426/581 |
| 1,432,699 | 10/1922 | Kinzer | 426/585 X |
| 2,745,750 | 5/1956 | Shafer et al. | 426/603 |
| 3,324,551 | 6/1967 | Mnilk et al. | 426/664 |
| 4,051,269 | 9/1977 | Strinning | 426/603 |
| 4,112,132 | 9/1978 | Badertscher et al. | 426/613 X |

_Primary Examiner_—Robert A. Yoncoskie
_Attorney, Agent, or Firm_—Karl W. Flocks

[57] ABSTRACT

A process for the continuous production of a butter-like edible fat product, spreadable at refrigerator temperature and consisting of cow's cream and 15–30% (based on the total fat content) of a vegetable, tocopherol-containing triglyceride oil, comprising the following steps. First, the fat content of the cream is adjusted to 36–38% by weight, whereupon the cream is cooled to 3°–4° C. and stored for at least 3 hours. Then the cream is pumped in a stream to a continuous butter making machine of the Fritz type. All or a considerable portion of the oil is injected into the stream of cream between the storage and the butter making machine. After admixing, but ahead of the butter making machine, the injected oil is finely divided and emulsified. The relative amounts of the cream and the injected oil in the stream entering the butter making machine is so adjusted to obtain a total fat content of more than 40% by weight. The temperatures are controlled so that the mixture entering the butter making machine will be at 5°–6° C. Churning is effected at a temperature of 5°–7° C. Unless all oil has been injected into the stream, the remaining portion of the product's oil is added to the working section of the butter making machine.

8 Claims, 2 Drawing Figures

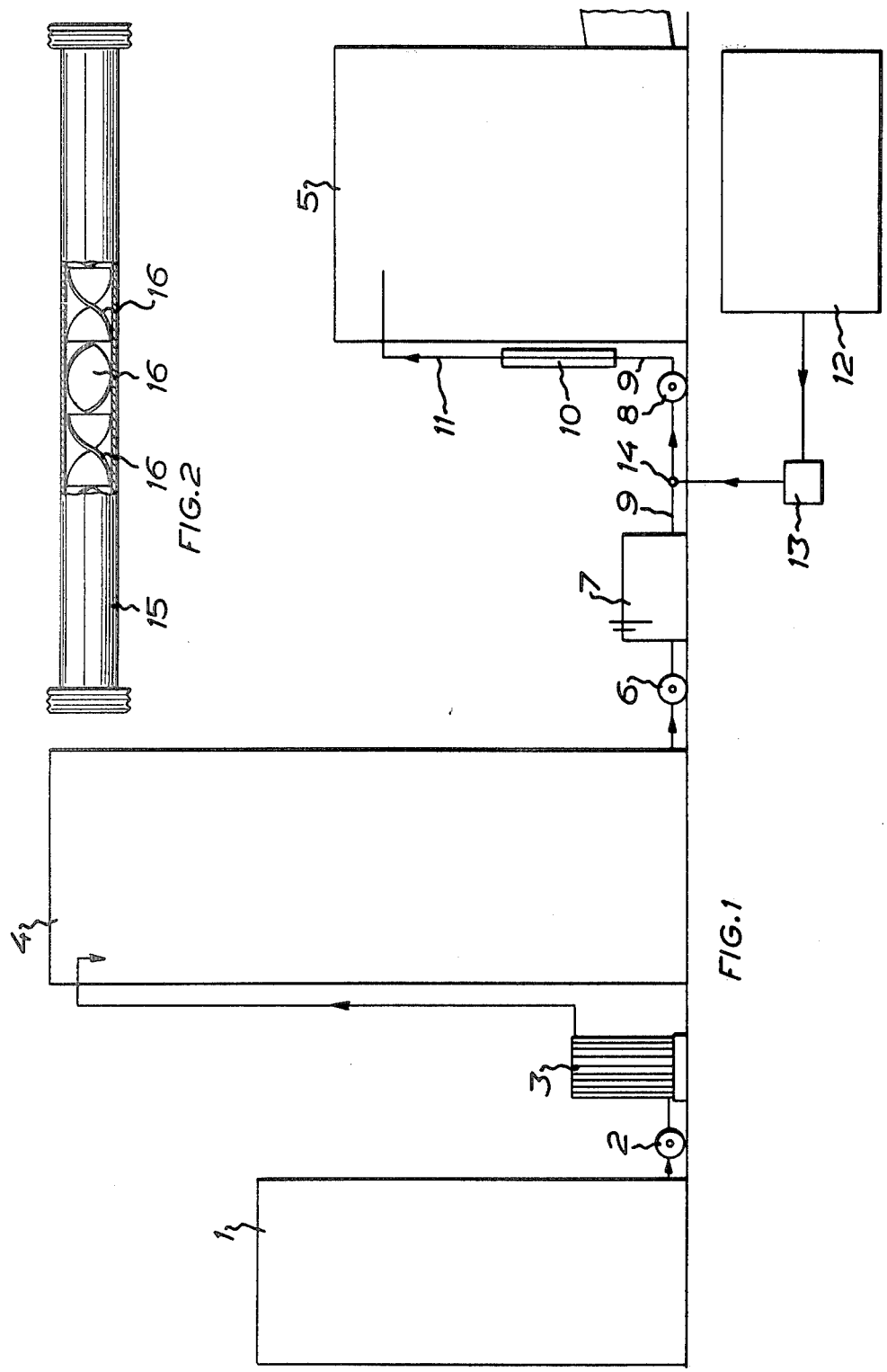

PROCESS FOR THE CONTINUOUS PRODUCTION OF A BUTTER-LIKE EDIBLE FAT PRODUCT

A butter-like edible fat product is available which can be used in the same way as butter and is spreadable at refrigerator temperature (6°-8° C.) and which consists of acidified or non-acidified and/or temperature-treated cream separated from cow's milk and a refined vegetable, tocopherol-containing triglyceride oil, preferably soy bean oil, the oil amounting to 15-30% by weight of the total fat content of the edible fat.

Up to now, this edible fat product had to be produced in batches by utilising a conventional batch type churn, the vegetable oil being added to the previously acidified and temperature-treated cream in the churn. For a long time past, it has been known to make ordinary butter by a continuous process, int.al. by the so-called Fritz process, and in recent years this continuous process has become more and more common for making ordinary butter.

There now is need of a process by which also the abovementioned edible fat product can be produced continuously in a Fritz type butter making machine. However, it is not possible simply to follow the procedure utilised in continuous butter making or in the batchwise production of the edible fat product referred to above, because this technique presents several difficult problems with regard to the treatment of the cream, the method of adding and distributing the vegetable oil in the cream, the churning, the composition of the edible fat product and the consistency of the freshly churned product.

The present invention aims at providing a solution of these problems in such a way that it is possible, by applying the teachings of the invention, to obtain an edible fat product of high quality with undiminished churning efficiency and while maintaining the prescribed fat content of the finished product and achieving an economically satisfactory hourly capacity of the plant, all without making any changes in the technical equipment of the buttermaker proper.

The present invention thus proposes a process for the continuous production of the edible fat product referred to above, said process being characterised by the features stated in the claims.

The invention will now be described in more detail with reference to the following production example and the accompanying drawing. In the drawing:

FIG. 1 is a diagrammatic view of a plant for carrying the process of the invention into effect;

FIG. 2 is a lateral view, partly in section, of a static mixer comprised by the plant.

Cream that has been separated from cow's milk is acidified bacteriologically and temperature-treated in a manner known from conventional butter making in a cream acidifying tank 1, the fat content of the cream being adjusted to 36-38% by weight and the acidification degree of the cream to a pH of about 4.6. The acidified cream is pumped by means of a positive displacement pump 2 through a plate heat exchanger 3 where it is chilled to 3°-4° C., and from there to a storage tank 4 holding the daily quantity of cream. The acidified and chilled cream must be stored in the tank 4 for at least 3 hours, preferably 4 hours or more, before it is pumped to the buttermaker. At the low temperature in the storage tank, an after-crystallisation of the cream fat occurs, whereby the crystallisation degree of the fat is increased. During the residence time in the storage tank 4, the temperature of the cream rises to about 5° C., mainly because of the crystallisation heat. After a suitable residence time in the storage tank 4, the cream is ready for a continuous production of the edible fat product in a continuous butter making machine 5 of the Fritz type, for instance a machine of the type HCT 2 A as manufactured by Aktieselskabet Paasch & Silkeborg Maskinfabrikker, Silkeborg, Denmark.

The cream is pumped by means of a positive displacement pump 6 from the storage tank 4 to a conventional balance tank 7 and from there in a constant stream generated by a pump 8 through a conduit 9 to a static mixer 10 and finally through a conduit 11 to the churning cylinder of the buttermaker 5. The cream now has a temperature of about 5° C. Oil is pumped by means of a dosing pump 13 from a cooling tank 12 containing refined soy bean oil at a temperature of about 5° C. to an admixture station 14 situated on the conduit 9 between the balance tank 7 and the pump 8, at which station the oil is injected in a predetermined amount per unit of time into the cream stream arriving from the balance tank 7 in a constant amount per unit of time. In addition to the mixing of cream and oil which takes place through an injection nozzle at the admixture station 14, a further mixing and emulsifying of the oil in the cream stream is obtained by the action of the pump 8 and by means of the static mixer 10. In a preferred embodiment of the invention, the static mixer consists of a pipe 15 (see FIG. 2) which is connected between the conduits 9 and 11 and contains a series of baffle plates 16 helically wound through 180°, the side edges of said baffle plates engaging the inner wall of the pipe. Every second baffle plate in the pipe is turned clockwise, while the remaining plates are turned counterclockwise so that the mixture/emulsion of cream and oil will flow through the pipe in a helical flow path with repeated reversals of the helical direction, resulting in a turbulent flow. Static mixers of this type are manufactured by Alfa-Laval AB at Lund, Sweden. Instead of such a pipe with helically wound baffle plates, it is possible to use a pipe containing screening walls, i.e. partitions or baffles in the form of screens, through which the flow of cream and oil is allowed to pass. For maximum churning efficiency, the oil must be gently and carefully added to the cream so that the fat of the cream and the oil, respectively, will not be broken up into minute fat globules, which would diminish the churning efficiency since these globules do not participate in the formation of the edible fat and instead go directly to the buttermilk.

By controlling the pumps 6, 8 and 13, the relative amounts of cream and oil in the mixture entering the buttermaker 5 will be so adjusted that the mixture will have a total amount of fat of more than 40% by weight, preferably 43-45% by weight, and the amount of soy bean oil in the mixture will be 15-30% by weight of the total amount of fat in the mixture. Furthermore, the cream and the oil are added to the stream through the pipe 9 at such temperatures that the mixture entering the churning cylinder of the buttermaker 5 will have a temperature of preferably 5° C. and not more than 6° C. Churning is carried out at a temperature of 5°-7° C.

By following the procedure outlined above, the continuous butter making machine 5 can be made to give a high quality product and to operate with high churning efficiency, i.e. a low loss of fat in the buttermilk. Owing to int.al. the low churning temperature, the finished product has a temperature (about 10° C.) and a consistency corresponding to what is obtained in batchwise production in a conventional churn. The edible fat product discharged from the buttermaker 5 can therefore be further processed and packed in conventional manner.

The same technique regarding the treatment of the cream (time and temperature) and the addition and distribution of the vegetable oil in the cream as has been described above in connection with bacteriologically acidified cream may be employed also if the edible fat production is based upon the churning of a mixture of non-acidified cream and vegetable oil. However, the churning of such a mixture (emulsion) having a pH of about 6.7 will result in fat losses in the buttermilk that are considerably higher than with bacteriologically acidified cream of pH 4.6–4.7. When churning non-acidified cream, the buttermilk must therefore be separated in order to obtain a satisfactory churning efficiency/yield. When churning a non-acidified cream/oil mixture, the taste and aroma of the edible fat product can be improved by adding in the working section of the buttermaker a suitable bacteriological acidification culture to the product.

A butter making machine of the Fritz type has a churning section and a subsequent working section. Sometimes it may be advantageous to add but a considerable portion of the oil of the product at the admixture station 14 and to add the remaining portion of the product's oil in the working section of the buttermaker, in which case the remaining oil portion should have a temperature below 7° C. when added. That portion of the oil which is injected at the admixture station 14 must always be sufficient to increase the fat content of the mixture supplied to the buttermaker to a value of more than 40% by weight, preferably 43–45% by weight.

What I claim and desire to secure by Letters Patent is:

1. A process for the continuous production of a butter-like edible fat product which can be used in the same way as butter and is spreadable at refrigerator temperature of about (6°–8° C.) and which consists of cream separated from cow's milk and a refined vegetable tocopherol-containing triglyceride oil, the oil amounting to 15–30% by weight of the total fat content of the edible fat product, the process comprising the steps of:
    (1) adjusting the fat content of the cream to 36–38% by weight,
    (2) then cooling the cream to 3°–4° C. and introducing it into a storage tank,
    (3) keeping the cooled cream in said tank for at least 3 hours,
    (4) then pumping the cream in a stream from said tank to a continuous butter making machine of the Fritz type,
    (5) injecting the oil into said stream at an admixture station between said tank and said butter making machine,
    (6) finely dividing and emulsifying the injected oil in said stream after said admixture station but ahead of said butter making machine by mixing means,
    (7) adjusting the relative amounts of the cream and the injected oil in the mixture entering said butter making machine so that the mixture will obtain a total fat content of more than 40% by weight,
    (8) supplying the cream and the oil to said stream at such temperatures that the mixture entering said butter making machine will have a temperature of 5°–6° C.,
    (9) and effecting the churning in said butter making machine at a temperature of 5°–7° C.

2. A process according to claim 1, in which the step (7) of adjusting the relative amounts of the cream and the injected oil in the mixture entering said butter making machine is carried out so that the mixture will obtain a total fat content of 43–45% by weight.

3. A process according to claim 1, in which the step (6) of finely dividing and emulsifying the injected oil in said stream is carried out by conducting said stream through a pipe having turbulence-producing baffle plates.

4. A process according to claim 1, in which the step (6) of finely dividing and emulsifying the injected oil in said stream is carried out by conducting said stream through a pipe containing baffles in the form of screens.

5. A process according to claim 1, in which the stream of cream from said tank to said butter making machine is conducted through a balance tank before it reaches said admixture station.

6. A process for the continuous production of a butter-like edible fat product which can be used in the same way as butter and is spreadable at refrigerator temperature of about 6°–8° C. and which consists of cream separated from cow's milk and a refined vegetable tocopherol-containing triglyceride oil, the oil amounting to 15–30% by weight of the total fat content of the edible fat product, the process comprising the steps of:
    (1) acidifying the cream and adjusting the fat content of the cream to 36–38% by weight,
    (2) then cooling the cream to 3°–4° C. and introducing it into a storage tank,
    (3) keeping the cooled cream in said tank for at least 3 hours,
    (4) then pumping the cream in a stream from said tank to a continuous butter making machine of the Fritz type,
    (5) injecting the oil into said stream at an admixture station between said tank and said butter making machine,
    (6) finely dividing and emulsifying the injected oil in said stream after said admixture station but ahead of said butter making machine by mixing means,
    (7) adjusting the relative amounts of the cream and the injected oil in the mixture entering said butter making machine so that the mixture will obtain a total fat content of more than 40% by weight,
    (8) supplying the cream and the oil to said stream at such temperatures that the mixture entering said butter making machine will have a temperature of 5°–6° C.,
    (9) and effecting the churning in said butter making machine at a temperature of 5°–7° C.

7. A process according to claim 6, further comprising the step of adjusting the pH of the cream during the acidification step to about 4.6.

8. A process for the continuous production of a butterlike edible fat product which can be used in the same way as butter and is spreadable at refrigerator temperature of about 6°–8° C. and which consists of cream separated from cow's milk and a refined vegetable tocopherol-containing triglyceride oil, the oil amounting to 15–30% by weight of the total fat content of the edible fat product, the process comprising the steps of:
    (1) adjusting the fat content of the cream to 36–38% by weight,
    (2) then cooling the cream to 3°–4° C. and introducing it into a storage tank, (3) keeping the cooled cream in said tank for at least 3 hours,
(4) then pumping the cream in a stream from said tank to a continuous butter making maching of the Fritz type,
(5) injecting a major part of the product's oil into said stream at an admixture station between said tank and said butter making machine,
(6) finely dividing and emulsifying the injected oil in said stream after said admixture station but ahead of said butter making machine by mixing means,
(7) adjusting the relative amounts of the cream and the injected oil in the mixture entering said butter making machine so that the mixture will obtain a total fat content of more than 40% by weight,
(8) supplying the cream and the injected oil to said stream at such temperatures that the mixture entering said butter making machine will have a temperature of 5°–6° C.,
(9) effecting the churning in said butter making machine at a temperature of 5°–7° C.,
(10) and adding the remaining portion of the product's oil to the working section of said butter making machine.

* * * * *